United States Patent [19]

Kuwana et al.

[11] Patent Number: 5,058,018
[45] Date of Patent: Oct. 15, 1991

[54] ANTI-SKID CONTROL SYSTEM FOR A ROAD SURFACE HAVING A SPLIT COEFFICIENT OF FRICTION

[75] Inventors: Kazutaka Kuwana, Toyota; Tsuyoshi Yoshida, Obu; Kenji Tozu, Kariya, all of Japan

[73] Assignee: Aisin Seiki K.K., Aichi, Japan

[21] Appl. No.: 498,658

[22] Filed: Mar. 26, 1990

[30] Foreign Application Priority Data

Mar. 27, 1989 [JP] Japan .................................. 1-74704

[51] Int. Cl.$^5$ ..................... G06F 15/50; B60T 8/58; B60T 8/64
[52] U.S. Cl. ............................ 364/426.02; 303/102; 303/111
[58] Field of Search ................... 364/426.02, 426.01; 303/102, 106, 109, 111, 110

[56] References Cited

U.S. PATENT DOCUMENTS

| | | |
|---|---|---|
| 3,840,278 | 10/1974 | Fleischer et al. |
| 3,918,766 | 11/1975 | Klatt |
| 3,926,477 | 12/1975 | Klatt |
| 3,972,568 | 8/1976 | Fleischer ........................ 303/111 X |
| 4,349,876 | 9/1982 | Lindemann ..................... 303/106 X |
| 4,489,382 | 12/1984 | Jonner et al. .................... 303/110 X |
| 4,593,955 | 6/1986 | Leiber ................................ 303/106 |

FOREIGN PATENT DOCUMENTS 56-28738 7/1981 Japan .
59-19863 5/1984 Japan .

Primary Examiner—Parshotam S. Lall
Assistant Examiner—E. J. Pipala
Attorney, Agent, or Firm—Sughrue, Mion, Zinn, Macpeak & Seas

[57] ABSTRACT

The invention is directed to an arrangement for controlling a braking force applied to each of right and left road wheels individually depending upon a braking condition, with a hydraulic braking pressure supplied to each of wheel brake cylinders through actuators respectively. The actuators are controlled by the braking force control system wherein output signals of wheel speed detectors are fed into first and second detecting circuits respectively by which the braking conditions of the road wheels are detected. Then, the detected signals are fed into a first driving circuit which produces driving signals fed to the actuators on the basis of an output signal fed from either of the detectors for one road wheel having a tendency to be locked first. One of the actuators provided for the road wheel on the road surface of the lower coefficient of friction is driven by a driving signal fed from the first driving circuit, whereas the other actuator is driven by a driving signal which is fed from the first driving circuit and modified thereafter by the second driving circuit in response to a value representing a vehicle speed so as to increase the hydraulic braking pressure rapidly when the vehicle is driven at low speed, consequently shortening the stopping distance.

9 Claims, 6 Drawing Sheets

ANTI-SKID CONTROL SYSTEM FOR A ROAD SURFACE HAVING A SPLIT COEFFICIENT OF FRICTION

BACKGROUND OF THE INVENTION

1. Field of the Invention

The present invention relates to an anti-skid control system for use in an automotive vehicle, and more particularly to an anti-skid control system for controlling braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing, increasing, or holding a hydraulic braking pressure supplied to a wheel brake cylinder, and which is also called as an anti-locking control system. In view of the fact that when the hydraulic braking pressure supplied to the wheel brake cylinder is increased, the rotational speed of the road wheel is rapidly reduced immediately before a coefficient of friction of a road surface relative to the road wheel reaches a maximum, the anti-skid control system controls the wheel cylinder pressure according to the deceleration of the vehicle in order that a slip rate of the road wheel results in around 20%, that is, the maximum coefficient of friction is obtained.

As for the control of the braking force applied to the road wheel according to the above anti-skid control system, if the braking force is applied to a pair of right and left road wheels when the vehicle is running on a road surface having a different coefficient of friction between the surfaces at each side of the vehicle in the moving direction thereof, or right and left road wheels, that is, when the vehicle is running on a non-symmetrical road surface or so-called split road surface, as in the case where one of the road wheels at either side of the vehicle is on the road surface having the lower coefficient of friction, and the other is on the road surface having the higher coefficient of friction, an usual anti-skid control will be insufficient, and further a steering control for compensating a yaw moment may be necessitated. For example, if the anti-skid control is initiated when a road wheel at one side of the vehicle is running on a dry road surface, and a road wheel at the other side of the vehicle is running on a wet road surface, and if the braking force is controlled individually depending upon the locking condition of each road wheel during the anti-skid operation, the road wheel on the road surface of the lower coefficient of friction such as the wet road surface will tend to be locked immediately so that the anti-skid control will be initiated, whereas the road wheel on the road surface of the higher coefficient of friction such as the dry road surface will not tend to be locked immediately so that a sufficient braking force will be applied. Thus, the yaw moment will arise when the vehicle is running on the split road surface, notwithstanding that the vehicle is equipped with the anti-skid apparatus, and the yaw moment will force the vehicle to swerve toward the side of the road surface having the higher coefficient of friction, so that the driver of the vehicle will have to countersteer immediately.

In Japanese Patent Publication No. 56-28738, which corresponds to U.S. Pat, No. 3,840,278, it has been proposed that a common pulse source is provided for both brakes located at opposite sides of the vehicle and the pulse source is controlled by two acceleration sensors for sensing wheel acceleration at opposite sides of the vehicle, whereby the wheel braking pressure is applied to one side of the vehicle only slowly, even if only a wheel on the other side has begun to lock, and at the side of the vehicle where better road conditions prevail, e.g. a dry side of the road, braking pressure will increase at a lesser rate than theoretically permissible. Then, it is concluded that the yaw moment will increase slowly, easily permitting counter steering Also, in Japanese Publication No. 59-19863, which corresponds to U.S. Pat. No. 3,918,766, it has been proposed to cause a brake pressure on a first vehicle wheel having a higher road adhesion than a second wheel on the side of a vehicle opposite the first wheel to assume a holding phase when a skidding tendency of the second wheel is indicated, and during this holding phase, the first wheel brake pressure is held constant at a level attained at the time the skidding tendency of the second wheel is indicated. Then, it is concluded that less initial steering response to the resulting vehicle yaw is required and consequently less oversteering correction and oscillation results.

However, either system disclosed in the above publications will cause a stopping distance of the vehicle to be increased. In the case where the vehicle is driven at high speed, the difference between the braking pressures in the wheel brake cylinders for right and left road wheels must be controlled less than a certain value in order to maintain the controllability of the steering, since the larger the difference is, the more the steering must be steered. Accordingly, supposing that the condition for the anti-skid control is set with its upper limit of the difference between the hydraulic braking pressures in the wheel brake cylinders mounted on the right and left road wheels on the road surfaces having a different coefficient of friction when running at high speed, in the case where the hydraulic braking pressure is controlled when running at low speed, the hydraulic braking pressure applied to the road wheel on the road surface of the higher coefficient of friction is gradually increased even if the steering may be steered appropriately. This will cause the stopping distance to be increased.

SUMMARY OF THE INVENTION

Accordingly, it is an object of the present invention to provide an anti-skid control system for an automotive vehicle which ensures a controllability of the steering and attains reduction of a stopping distance.

In accomplishing the above and other objects, an anti-skid control system for controlling a braking force applied to road wheels of an automotive vehicle comprises a pair of wheel brake cylinders which are mounted on right and left road wheels of the vehicle respectively for applying braking force thereto, a hydraulic pressure generator for supplying a hydraulic braking pressure to each of the wheel brake cylinders, actuating means disposed in each of hydraulic circuits communicating the hydraulic pressure generator with each of the wheel brake cylinders for individually controlling the hydraulic braking pressure supplied to each of the wheel brake cylinders, and wheel speed detecting means for detecting a rotational wheel speed of each of the road wheels and providing output signal corresponding to the wheel speed. The anti-skid control system is provided with braking force control means for controlling the actuating means in response to the output signal of the wheel speed detecting means. This braking force control means includes first detecting means and second detecting means for detecting each braking condition of the road wheels respectively on the basis of the output signals of the wheel speed detecting means, first driving means for producing driving signals supplied to the actuating means on the basis of an output signal fed from one of the first and second detecting means for detecting a braking condition of one of the road wheels having a tendency to be locked firstly, and second driving means for receiving the driving signals from the first driving means and modifying the driving signal supplied to one of the actuating means provided for the other of the road wheels in response to a value representing a vehicle speed.

In the above-described anti-skid control system, the first driving means preferably includes split determination means for determining if the vehicle is running on a split road surface having a different coefficient of friction where one of the road wheels is on a road surface of the higher coefficient of friction and the other of the road wheels is on a road surface of the lower coefficient of friction, and the braking force control means is arranged to supply the driving signals to the actuating means through the first and second driving means when the split determination means determines that the vehicle is running on the split road surface, while the braking force control means drives each of the actuating means independently when the vehicle is not running on the split road surface.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
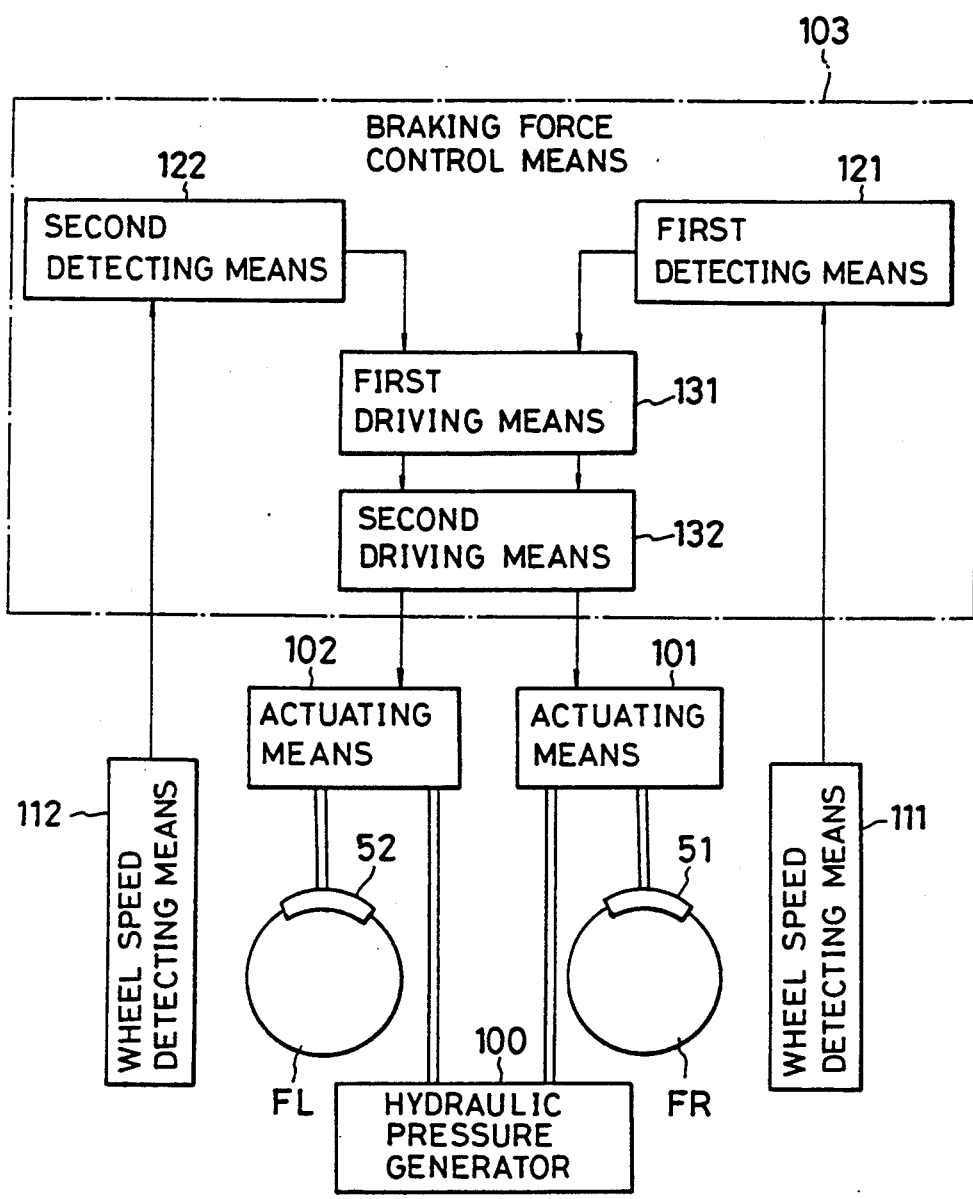
FIG. 1 is a general block diagram illustrating an anti-skid control system according to the present invention.

Referring to FIG. 1, there is schematically illustrated an anti-skid control system according to the present invention, which controls a braking force applied to at least each of right and left front road wheels FR, FL of a vehicle individually depending upon a braking condition. In this anti-skid control system, it is so arranged that when the hydraulic pressure generator 100 is operated, a hydraulic braking pressure is supplied to each of wheel brake cylinders 51, 52 through actuating means 101, 102, so that a braking force is applied to each of the road wheels FR, FL. And, a rotational speed or wheel speed of each of the road wheels FR, FL is detected by wheel speed detecting means 111, 112 respectively. The actuating means 101, 102 are controlled by the braking force control means 103, wherein output signals of the wheel speed detecting means 111, 112 are fed into first detecting means 121 and second detecting means 122 respectively by which the braking conditions of the road wheels FR, FL are detected. Then, the detected signals are fed from the first and second detecting means 121, 122 into first driving means 131 which produces driving signals supplied to the actuating means 101, 102 on the basis of an output signal from either of the first and second detecting means 121, 122 with respect to one road wheel out of the road wheels FR, FL having a tendency to be locked firstly, e.g. the road wheel FR. The above driving signals are fed to the second driving means 132. A driving signal for driving the actuating means for the other road wheel out of the road wheels FR, FL, e.g. the actuating means 102 for the road wheel FL, is modified in response to a value representing the vehicle speed which is provided according to the output signals of the wheel speed detecting means 111, 112, for instance.

Accordingly, the actuating means provided for the road wheel running on the road surface of the lower coefficient of friction and having a tendency to be locked firstly, e.g. the actuating means 101 is driven by a driving signal fed from the first driving means 131. Whereas, the actuating means 102 is driven by a driving signal which is fed from the first driving means 131 and modified thereafter by the second driving means 132. For example, when the vehicle is driven at high speed, the driving signal fed to the actuating means 102 will be a signal for increasing the hydraulic braking pressure gradually, whereas the driving signal will be modified to be a signal for increasing the hydraulic pressure rapidly when the vehicle is driven at low speed. Consequently, the anti-skid control for both the road wheels FR, FL will be performed without enlarging the difference between the hydraulic braking pressure of the wheel cylinder 51 and that of the wheel brake cylinder 52 when the vehicle is driven at high speed, while it will be performed without deteriorating the controllability of the steering and without increasing the stopping distance when the vehicle is driven at low speed.

Figure 2:
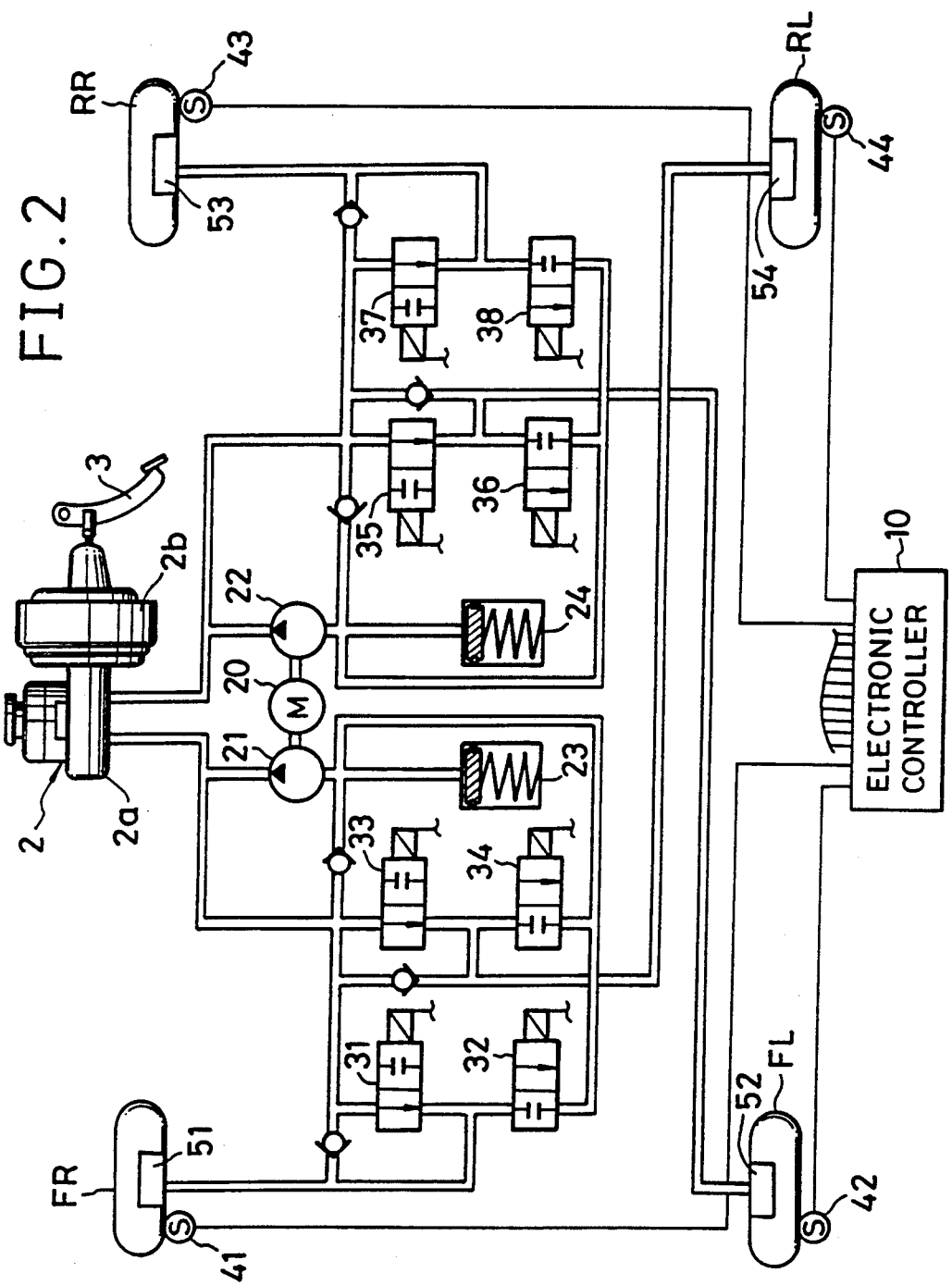
FIG. 2 is a schematic block diagram of an anti-skid control system of an embodiment of the present invention.
Figure 3:
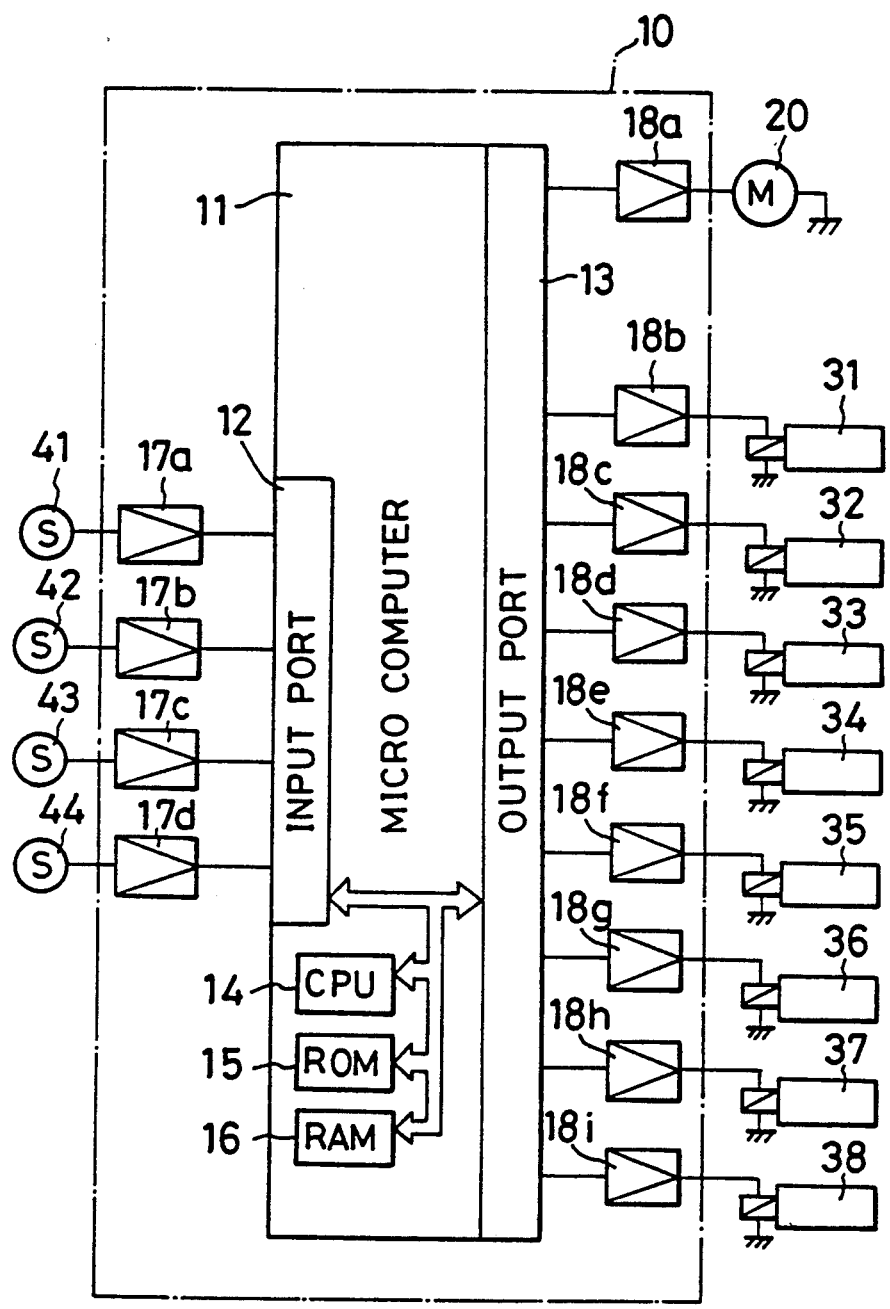
FIG. 3 is a block diagram illustrating the arrangement of the electronic controller shown in FIG. 2.
Figure 4:
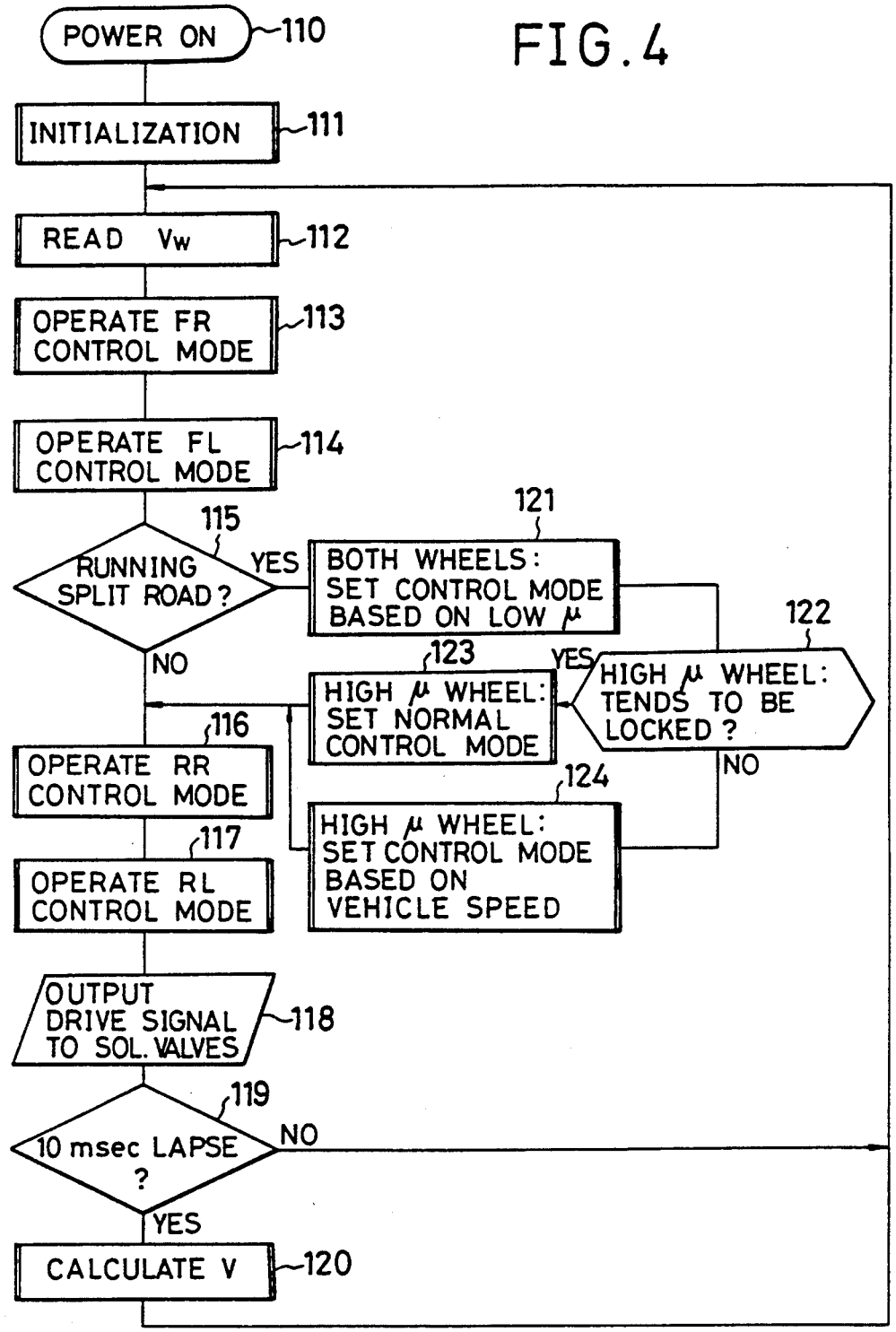
FIG. 4 is a flowchart showing the operation of the braking force control of the electronic controller according to an embodiment of the present invention.

More specifically, an embodiment of the present invention is illustrated in FIGS. 2 to 4. Referring to FIG. 2, pumps 21, 22, reservoir 23, 24 and solenoid valves 31 to 38 are disposed in hydraulic circuits for connecting a hydraulic pressure generator 2, which comprises a master cylinder 2a and a booster 2b operated in response to depression of a brake pedal 3, to wheel brake cylinders 51 to 54 of road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 2.

The solenoid valves 31, 32 and solenoid valves 33, 34 are disposed respectively in hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35, 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36, 38 through the hydraulic circuits at the drain side thereof, and to supply the brake fluid to each of those solenoid valves when the pumps 21, 22 operate.

Each of the solenoid valves 31 to 38 is a two ports-two positions solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 energized or de-energized, the hydraulic braking pressure in each of the wheel brake cylinders 51 to 54 is decreased or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 38, there may be employed three ports-two positions solenoid operated valves of a half number of the valves 31 to 38.

The above-described solenoid valves 31 to 38 are connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor.

As shown in FIG. 3, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 38 via the respective drive circuits 18b to 18i.

A program routine executed by the electronic controller 10 for the anti-skid control will now be described with reference to FIG. 4, which is a flowchart showing an operation executed in accordance with a program of one embodiment of the present invention, which program is executed repeatedly at intervals of a predetermined period of time.

The program routine starts at Step 110 when a power source is turned on, and provides for initialization of the system at Step 111, wherein an estimated vehicle speed V which corresponds to the value representing the vehicle speed according to the present invention and a wheel speed Vw of each road wheel are set to zero. Then, the program proceeds to Step 112 where the wheel speed Vw detected by each of the wheel speed sensors 41 to 44 is read in the microcomputer 11. The estimated vehicle speed V is calculated as follows. A vehicle speed in braking operation is set to a value calculated on the assumption that the vehicle speed is reduced with a predetermined deceleration from the vehicle speed corresponding to the wheel speed in braking operation, and then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed.

Next, the control mode for the anti-skid control is successively operated for each of the front road wheels FR, FL at Steps 113, 114, in order that the hydraulic braking pressure supplied to each of the wheel brake cylinders 51, 52 is increased rapidly or gradually, or decreased rapidly or gradually depending upon the braking condition of the front road wheels FR, FL. In the anti-skid control for each of the road wheels FR, FL, each of the solenoid valves 31 to 34 is controlled, according to a wheel acceleration of each of the road wheels FR, FL and a slip rate S obtained from the estimated vehicle speed V and the wheel speed Vw, such that the slip rate S is optimum in view of a coefficient of friction of a road surface and a lateral force applied to the vehicle. The respective anti-skid control is known, so that the detailed description thereof will be omitted.

Figure 5:
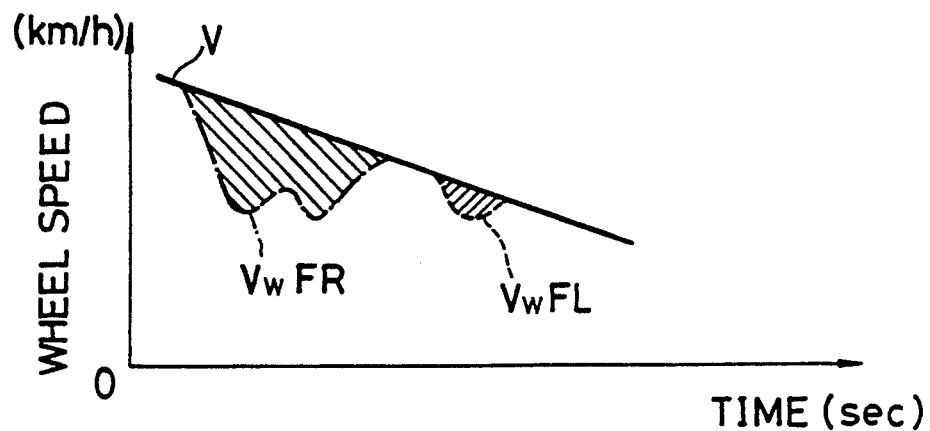
FIG. 5 is a timing chart of the wheel speed VwFR, VwFL and the estimated vehicle speed V of the above embodiment.

When the operation of the control mode for each of the front road wheels FR, FL is executed, the program proceeds to Step 115 where it determines if the front road wheels FR, FL are running on the split road surface, in accordance with the following expression:

$$|\Sigma(V-Vd-VwFR)-\Sigma(V-Vd-VwFL)| > IVsp$$

where V corresponds to the estimated vehicle speed, VwFR corresponds to the wheel speed of the front road wheel FR, VwFL corresponds to the wheel speed of the front road wheel FL, Vd corresponds to a speed for providing a neutral zone, and IVsp corresponds to a level speed for determining whether the vehicle is running on the split road surface. Accordingly, if the above expression is effectuated, the front road wheels FR, FL are determined to be running on the split road surface. Referring to FIG. 5, for example, when the brake pedal 3 is depressed to apply a braking force to each of the road wheels FR, FL and the wheel speed VwFR is reduced to such extent that the wheel acceleration is less than a predetermined value, the anti-skid operation is initiated. Then, the hydraulic braking pressure supplied to the wheel brake cylinder (hereinafter simply referred to as wheel cylinder pressure) is decreased to prevent the front road wheel FR from being locked, and the wheel cylinder pressure is increased when the front road wheel FR recovers its wheel speed close to the estimated vehicle speed V. In this case, the wheel speed VwFL of the front road wheel FL is decreased in accordance with the decrease in the estimated vehicle speed V, and the time when the front road wheel FL tends to be locked is belated. Therefore, when the difference in the areas having oblique lines as shown in FIG. 5 between the area surrounded by a curve designating the wheel speed VwFR and the area surrounded by a curve designating the wheel speed VwFL exceeds the predetermined value IVsp, the above-described expression is effectuated so that it is determined that the front road wheels FR, FL are running on the split road surface. That is, FIG. 5 shows that the front road wheel FR is running on the road surface of the lower coefficient of friction, whereas the front road wheel FL is running on the road surface of the higher coefficient of friction.

In the case where the front road wheels FR, FL are not running on the split road surface, the program proceeds to Steps 116, 117 where the control mode for each of the rear road wheels RR, RL is operated successively. In the present embodiment, a braking force which is applied to one of the rear road wheels RR, RL rotating at the lower speed, is applied to both of the rear road wheels RR, RL simultaneously according to a low speed selection simultaneous control mode. On the other hand, when the road wheels FR, FL are determined to be running on the split road surface at Step 115, the program proceeds to Step 121 where the anti-skid control mode is modified or reset in accordance with the control mode of one of the front road wheels FR, FL running on the road surface of the lower coefficient of friction, e.g., the control mode of the front road wheel FR in the above-described case. In FIG. 4 and the following figures, a letter of $\mu$ designates a coefficient of friction. Then, the program proceeds to Step 122 where it determines if the wheel cylinder pressure has reached to such a pressure for causing the road wheel running on the road surface of the higher coefficient of friction, e.g., the front road wheel FL in the above-described case, to have a tendency to be locked. If the result is affirmative, the program proceeds to Step 123 where the front road wheel FL running on the road surface of the higher coefficient of friction is controlled according to the normal control mode set on the basis of its own control mode. Otherwise, the program proceeds to Step 124.

Figure 6:
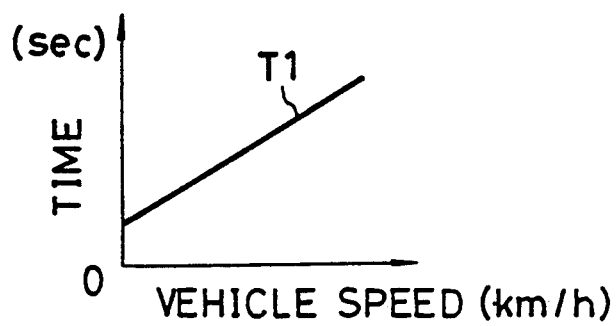
FIG. 6 is a diagram showing the characteristic of the period T1 for use in the control of the wheel cylinder pressure for the road wheel at the higher coefficient of friction side in the above embodiment.
Figure 7:
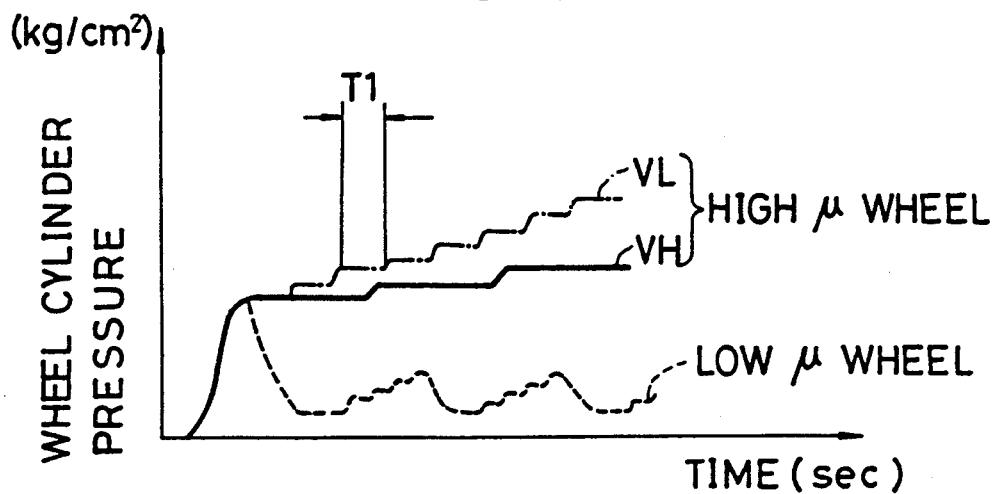
FIG. 7 is a diagram showing the control of the wheel cylinder pressure for the road wheel at each side of the vehicle in the above embodiment.

In Step 124, the front road wheel FL running on the road surface of the higher coefficient of friction is controlled according to an anti-skid control mode which is reset by modifying the condition for controlling the front road wheel FR running on the road surface of the lower coefficient of friction in response to the estimated vehicle speed V. As shown in FIG. 7, the wheel cylinder pressure applied to the front road wheel FL running on the road surface of the higher coefficient of friction (designated as HIGH $\mu$ WHEEL) is controlled such that it is increased at a predetermined rate every period of time T1 from the wheel cylinder pressure applied to the front road wheel FR running on the road surface of the lower coefficient of friction (designated as LOW $\mu$ WHEEL) at the time of initiation of the anti-skid control therefor. This period T1 is obtained according to the equation of T1=f(V), which means that the period T1 is a function of the estimated vehicle speed V as shown in FIG. 6. Consequently, when the vehicle is driven at high speed, the period T1 is long so that the wheel cylinder pressure is increased gradually as indicated by a solid line (VH) in FIG. 7, whereas when the vehicle is driven at low speed, the period T1 is short so that the wheel cylinder pressure is increased rapidly as indicated by one-dotted chain line (VL). After these Steps 123, 124 have been executed, the program proceeds to the above-described Steps 116, 117.

The program then proceeds to Step 118 where a drive signal is output to each of the solenoid valves 31 to 38 according to each final control mode for the road wheels FR, FL, RR, RL, whereby each of the solenoid coils is energized or de-energized so that the hydraulic braking pressure supplied to each of the wheel brake cylinders 51 to 54 is controlled. Then, the program proceeds to Step 119 where it determines if a predetermined period of time, e.g., 10 millisecond (msec) elapses. If the result is affirmative, the program proceeds to Step 120 where the estimated vehicle speed V is calculated. If the result is negative at Step 119, the program returns to Step 112 without calculating the estimated vehicle speed V to repeat the previous Steps. This predetermined time interval is provided according to the resolving power of the vehicle speed in the microcomputer 11.

As described above, according to the present embodiment, it is determined whether or not the right and left front road wheels FR, FL are running on the split road surface. If the road wheels FR, FL are determined to be running on the split road surface, the wheel cylinder pressure applied to the road wheel running on the road surface of the higher coefficient of friction is controlled according to the condition which is provided for the wheel cylinder pressure applied to the road wheel running on the road surface of the lower coefficient of friction, and modified in response to the estimated vehicle speed V. Consequently, when the vehicle is driven at low speed, the wheel cylinder pressure applied to the road wheel running on the road surface of the higher coefficient of friction increases appropriately, without being forced to increase gradually as in the prior system. As a result, an appropriate braking force is applied to the road wheel running on the road surface of the higher coefficient of friction with sufficient time for maneuvering the steering wheel against the yaw moment, so that the stopping distance is shortened comparing with the prior system.

In the present embodiment, the estimated vehicle speed V corresponds to the value representing the vehicle speed according to the present invention, and the second driving means and the like of the present invention are constituted from the wheel speed sensors 41 to 44 and the electronic controller 10. The wheel speed Vw may be used for the value representing the vehicle speed as it is, instead of the estimated vehicle speed V. As the vehicle speed detecting means, there may be employed means for detecting the vehicle speed through a wind force or the like.

Figure 8:
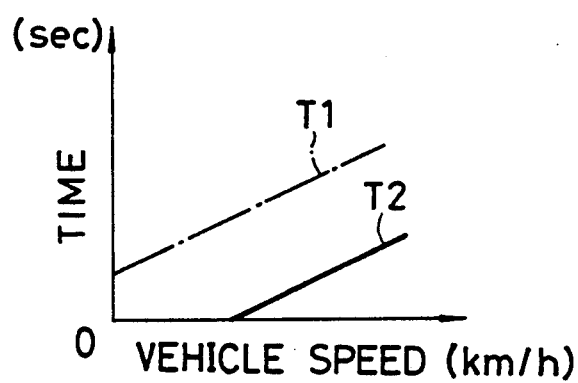
FIG. 8 is a diagram showing the characteristic of the prediods T1, T2 for use in the control of the wheel cylinder pressure for the road wheels at the higher coefficient of friction side according to another embodiment of the present invention.
Figure 9:
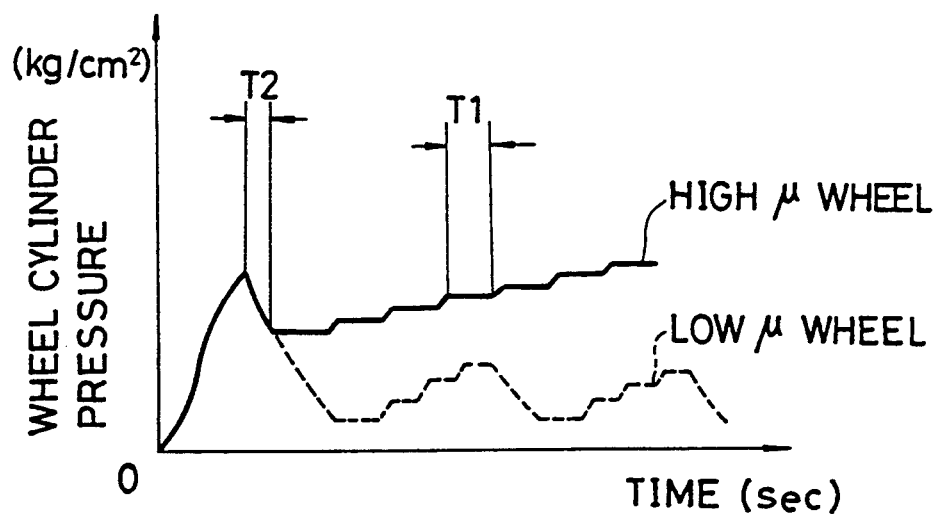
FIG. 9 is a diagram showing the control of the wheel cylinder pressure for the road wheel at each side of the vehicle in another embodiment of the present invention.

FIGS. 8 and 9 relate to the control for the road wheel running on the road surface of the higher coefficient of friction according to another embodiment of the present invention. As shown in FIG. 8, a period of time T2 is provided as a function of the estimated vehicle speed V in addition to the period T1 in FIG. 6. This period T2 is used for the control executed immediately after the initiation of the anti-skid control, as shown in FIG. 9. Namely, while both the front road wheels FR, FL are controlled in accordance with the control mode executed on the basis of the condition of the road wheel running on the road surface of the lower coefficient of friction in Step 121 in FIG. 4, even after it is proceeded to the step where the road wheel running on the road surface of the higher coefficient of friction is to be controlled according to the control mode modified in response to the vehicle speed, the road wheel is controlled according to the same control mode as that of the road wheel running on the road surface of the lower coefficient of friction until the period T2 elapses. Namely, there is provided the period T2 during which the wheel cylinder pressures for both the road wheels FR, FL are decreased at the same decreasing speed, as shown in FIG. 9. Thereafter, the wheel cylinder pressure is controlled according to the period T1 in the same manner as shown in FIG. 7.

Thus, in this embodiment, the wheel cylinder pressure applied to the road wheel running on the road surface of the higher coefficient of friction immediately after the initiation of the anti-skid control is controlled in the same manner as that applied to the road wheel running on the road surface of the lower coefficient of friction in order to hold the difference in braking force between the road wheels at both right and left sides of the vehicle small during the anti-skid control operation when the vehicle is driven at high speed. Thereby, the controllability of steering at the high speed driving is ensured. At the same time, since the wheel cylinder pressure applied to the road wheel running on the road surface of the higher coefficient of friction is increased rapidly thereafter, the stopping distance is avoided to extend.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle, comprising:

wheel brake cylinders operatively connected to right and left road wheels, respectively, of said vehicle for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for individually controlling said hydraulic braking pressure supplied to each of said wheel brake cylinders;

wheel speed detecting means for detecting a rotational wheel speed of each of said road wheels and providing an output signal corresponding to said wheel speed; and braking force control means for controlling said actuating means in response to said output signal of said wheel speed detecting means, said braking force control means including first detecting means and second detecting means for detecting each braking condition of said road wheels respectively on the basis of said output signal of said wheel speed detecting means, first driving means for producing driving signals fed to said actuating means on the basis of an output signal fed from one of said first and second detecting means for detecting a braking condition of one of said road wheels having a tendency to be locked firstly, said first driving means including split determination means for determining if said vehicle is running on a split road surface having a different coefficient of friction where one of said road wheels is on a road surface of the higher coefficient of friction and the other of said road wheels is on a road surface of the lower coefficient of friction; and second driving means for receiving said driving signals from said first driving means and modifying the driving signal fed to one of said actuating means provided for one of said road wheels on said road surface of the higher coefficient of friction in response to a value representing a vehicle speed immediately after said split determination means determines that said vehicle is running on said split road surface.

2. An anti-skid control system for an automotive vehicle as set forth in claim 1, wherein said first detecting means provides a first cumulative value of differences between a wheel speed of one of said road wheels and said value representing the vehicle speed during a predetermined period of time, and said second detecting means provides a second cumulative value of differences between a wheel speed of the other of said road wheels and said value representing the vehicle speed during said predetermined period of time, and wherein said split determination means comprises comparing means for comparing a difference between said first cumulative value and said second cumulative value with a predetermined value, and determining that said vehicle is running on said split road surface when said difference between said first cumulative value and said second cumulative value exceeds said predetermined value.

3. An anti-skid control system for an automotive vehicle as set forth in claim 1, wherein said second driving means includes locking condition determination means for determining if one of said road wheels on said road surface of the higher coefficient of friction tends to be locked, said second driving means modifying the driving signal fed to one of said actuating means for one of said road wheels on said road surface of the higher coefficient of friction, in response to said value representing the vehicle speed, only when one of said road wheels on said road surface of the higher coefficient of friction is determined to have no tendency to be locked.

4. An anti-skid control system for an automotive vehicle as set forth in claim 3, wherein said value representing the vehicle speed is an estimated vehicle speed calculated by said wheel speeds of said road wheels.

5. An anti-skid control system for an automotive vehicle as set forth in claim 3, wherein said value representing the vehicle speed is a wheel speed of one of said road wheels on said road surface of the higher coefficient of friction.

6. An anti-skid control system for an automotive vehicle as set forth in claim 3, wherein said second driving means drives said actuating means to increase the increasing speed of the hydraulic braking pressure supplied to said wheel brake cylinder for one of said road wheels on said road surface of the higher coefficient of friction.

7. An anti-skid control system for an automotive vehicle as set forth in claim 6, wherein said second driving means drives said actuating means to control the hydraulic braking pressure supplied to one of said wheel brake cylinders for one of said road wheels on said road surface of the higher coefficient of friction into the same pressure as the hydraulic braking pressure supplied to the other of said wheel brake cylinders for the other of said road wheels on said road surface of the lower coefficient of friction during a predetermined period of time immediately after the initiation of operation of said first driving means.

8. An anti-skid control system for controlling a braking force applied to road wheels of an automotive vehicle, comprising:
   wheel brake cylinders operatively connected to right and left road wheels, respectively, of said vehicle for applying braking force thereto;
   a hydraulic pressure generator for supplying a hydraulic braking pressure to each of said wheel brake cylinders;
   actuating means disposed in each hydraulic circuit communicating said hydraulic pressure generator with each of said wheel brake cylinders for individually controlling said hydraulic braking pressure supplied to each of said wheel brake cylinders;
   wheel speed detecting means for detecting a rotational wheel speed of each of said road wheels and providing an output signal corresponding to said wheel speed; and
   braking force control means for controlling said actuating means in response to said output signal of said wheel speed detecting means;
   wherein said braking force control means comprises:
   first detecting means for detecting a braking condition of one of said road wheels on the basis of said output signal of said wheel speed detecting means and providing a first cumulative value of differences between a wheel speed of one of said road wheels and an estimated vehicle speed calculated by said wheel speed during a predetermined period of time;
   second detecting means for detecting a braking condition of the other of said road wheels on the basis of said output signal of said wheel speed detecting means and providing a second cumulative value of difference between a wheel speed of the other of said road wheels and said estimated vehicle speed during said predetermined period of time;
   a first driving means for producing driving signals fed to said actuating means on the basis of an output signal fed from one of said first and second detecting means for detecting a braking condition of one of said road wheels having a tendency to be locked firstly, said first driving means including split determination means for determining if said vehicle is running on a split road surface having a different coefficient of friction where one of said road wheels is on a road surface of the higher coefficient of friction and the other of said road wheels is on a road surface of the lower coefficient of friction, said split determination means including comparing means for comparing a difference between said first cumulative value and said second cumulative value with a predetermined value, and determining that said vehicle is running on said split road surface when said difference between said first cumulative value and said second cumulative value exceeds said predetermined value; and
   second driving means for receiving said driving signals from said first driving means and including locking condition determination means for determining if one of said road wheels on said road surface of the higher coefficient of friction tends to be locked, said second driving means modifying the driving signal fed to one of said actuating means for one of said road wheels on said road surface of the higher coefficient of friction, in response to said estimated vehicle speed, and driving said actuating means to increase the increasing speed of the hydraulic braking pressure supplied to said wheel brake cylinder for one of said road wheels on said road surface of the higher coefficient of friction, immediately after said split determination means determines that said vehicle is running on said split road surface and only when one of said road wheels on said road surface of the higher coefficient of friction is determined to have no tendency to be locked; and
   wherein said braking force control means feeds said driving signals to said actuating means through said first and second driving means when said split determination means determines that said vehicle is running on said split road surface, while said braking force control means drives each of said actuating means independently when said vehicle is not running on said split road surface.

9. An anti-skid control system for an automotive vehicle as set forth in claim 8, wherein said second driving means drives said actuating means to control the hydraulic braking pressure supplied to one of said wheel brake cylinders for one of said road wheels on said road surface of the higher coefficient of friction into the same pressure as the hydraulic braking pressure supplied to the other of said wheel brake cylinders for the other of said road wheels on said road surface of the lower coefficient of friction during a predetermined period of time immediately after the initiation of operation of said first driving means.

* * * * *